United States Patent [19]

Eckloff

[11] Patent Number: 5,785,328
[45] Date of Patent: Jul. 28, 1998

[54] STACKABLE CART ASSEMBLY

[75] Inventor: Donald Eckloff, Cranford, N.J.

[73] Assignee: Star Metal Products, Inc., Linden, N.J.

[21] Appl. No.: 643,166

[22] Filed: May 3, 1996

[51] Int. Cl.$^6$ ............................................. B65D 21/036
[52] U.S. Cl. ............................ 280/33.998; 414/788.2; 206/821
[58] Field of Search ..................... 280/79.2, 47.34, 280/33.998, 33.991, 33.992, 33.997; 108/53.1, 53.5, 901; 206/503, 509, 821; 414/788.2

[56] References Cited

U.S. PATENT DOCUMENTS

| | | | |
|---|---|---|---|
| 1,912,847 | 6/1933 | Klepel | 280/79.2 X |
| 4,915,329 | 4/1990 | Doninger | 280/47.34 X |
| 5,611,554 | 3/1997 | Eckloff | 280/79.2 |

*Primary Examiner*—F. J. Bartuska
*Attorney, Agent, or Firm*—Edward Dreyfus, Esq.

[57] ABSTRACT

A stacking member for stacking one hamper cart on another hamper cart is provided that is easily installed, removed, and stored nested with other like stacking members. The stacking member is strong, yet relatively light weight, and functions, among other things, (1) to distribute the weight of the stacked cart evenly and to a major portion of the length of each sides and ends of the upper frame of the supporting cart, (2) index itself for quick installation in the proper position on the upper frame of the supporting cart, (3) orient and index the supported cart on the stacking member, (4) secure the stacked cart on the stacking member to prevent sliding or movement during transport by pinching or gripping the shifting, fixed axis center caster wheels, and (5) allow imprecise transverse placement of the stacked cart on the stacking member.

20 Claims, 5 Drawing Sheets

STACKABLE CART ASSEMBLY

FIELD OF INVENTION

The present invention relates to stackable cart assemblies and, more particularly, to stackable carts and devices facilitating the stacking one cart on to another for transportation or storage of the stacked cart assemblage. As used herein the term cart includes wheeled hampers, hamper trucks, rod type hand trucks or other similar wheeled carts. The terms stacked cart and supporting cart refer to the upper and lower carts, respectively, of an assembled stack.

BACKGROUND

Carts comprising a lower frame and a top frame connected by a series of upstanding flexible resilient metal rods with a vinyl or canvas lining have become popular for a variety of applications primarily because of these carts low manufacturing costs and strength-to-weight benefits. Recent advancements, such as those disclosed U.S. Pat. No. 5,611,554, issued Mar. 18, 1997, entitled "Cart", and owned by the same assignee hereof, include increased strength and rigidity for these types of carts. These improvements have increased the number of different applications to which these carts may be used. One application includes the long distance transportation of certain scrap goods such as recycled fiber products. Typically a large number of these carts, each filled with several hundred pounds of scrap materials are rolled into a truck for transport to another location. Although the floor of the truck can be almost completely covered with carts, only one layer of these carts is transported. Accordingly, the majority of space within the truck is free space which increases the shipping costs, fuel, and labor on a per unit cart basis.

Similarly, conventional carts must be stored or moved about individually, which also wastes vertical space in a warehouse or work area, makes it economically impractical to use a fork lift to move an individual cart, and requires two trips to move two carts which increases labor costs.

Accordingly, a need exists for an assembly that enables two or more carts to be vertically but stacked securely and quickly to prevent shifting or damage during transport.

SUMMARY OF EXEMPLARY EMBODIMENT OF THE PRESENT INVENTION

An exemplary assembly, according to the principles of the present invention, includes a cart that includes side and end structures that can support a predetermined load that is several times the weight of anticipated two stacked and fully loaded carts.

According to one aspect of the present invention, a stacking member is provided that is easily installed, removed, and stored nested with other like stacking members. The stacking member is strong, yet relatively light weight, and functions, among other things, (1) to distribute the weight of the stacked cart evenly and to a major portion of the length of each side and end portions of the upper frame of the supporting cart, (2) index itself in the proper position on the upper frame of the supporting cart, (3) orient and index the supported cart on the stacking member, (4) secure the stacked cart on the stacking member to prevent shifting, sliding or movement during transport, and (5) allow imprecise transverse placement of the stacked cart on the stacking member.

In one example, the stacking member includes a number of strengthening members, preferably box tubes, angle irons, and flat corner plates and longitudinal mid-length plates welded together. The corner plates support the corner casters of the cart above and the mid-length plates locate under the fixed axis center wheels of the cart above. The thickness of the corner plates is selected so that the weight of the loaded upper cart is distributed to the end casters and center casters of the stacked upper cart.

Transverse rails preferably welded to the mid-length plates are spaced so that substantially all the weight borne through the stacked cart center wheels are taken up by the transverse rails. This aspect of the invention enables a fork lift operator to lower the above cart on to the stacking plate slightly off center in the transverse direction. The rails also pinch or grip the center caster wheels and prevent lateral movement of the above cart on the stacking member during cornering by the truck or movement by a fork lift, or the like.

Another aspect of the present invention includes a stacking member of the type described in which angle members are provided having one leg resting on the upper frame of the supporting cart and the other leg extending down around the outside of the upper frame of the supporting cart to simply and precisely index or position the stacking member. Since the great majority of damage to the upper cart frames result in inward projections or dents, the outside indexing can cooperate with even most of the upper frame damaged carts. The ends of the depending legs are preferably rounded for safety and to avoid tearing canvas or vinyl liners.

A further aspect of the present invention is to distribute the static weight and dynamic loads of the upper cart to substantially the entire upper frame and all of the upstanding rods or sides and ends to the lower frame of the supporting cart.

Yet a further aspect of the present invention includes a stacking member of the type described that can be nested with other like stacking members to reduce the vertical height required for storage or transport.

Another aspect of the present invention is to provide a cart of the type described with reinforced side and end rods to increase the supporting strength and stackability under dynamic load conditions.

Other and further objects of the present invention will become apparent with the following detailed description of the appended drawings in which.

DETAILED DESCRIPTION OF EXEMPLARY EMBODIMENT OF INVENTION

Figure 1:
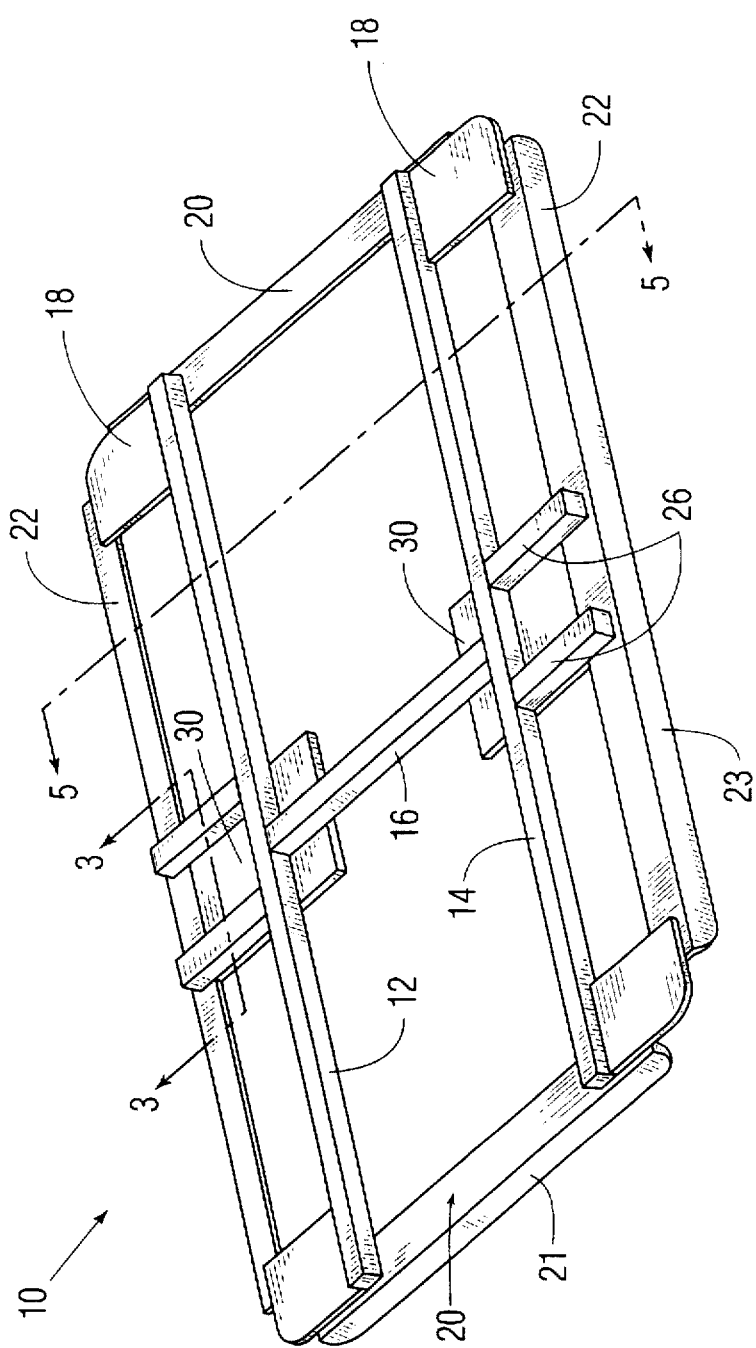
FIG. 1 is a top perspective one exemplary embodiment of a stacking member according to the principles of the present invention.
Figure 2:
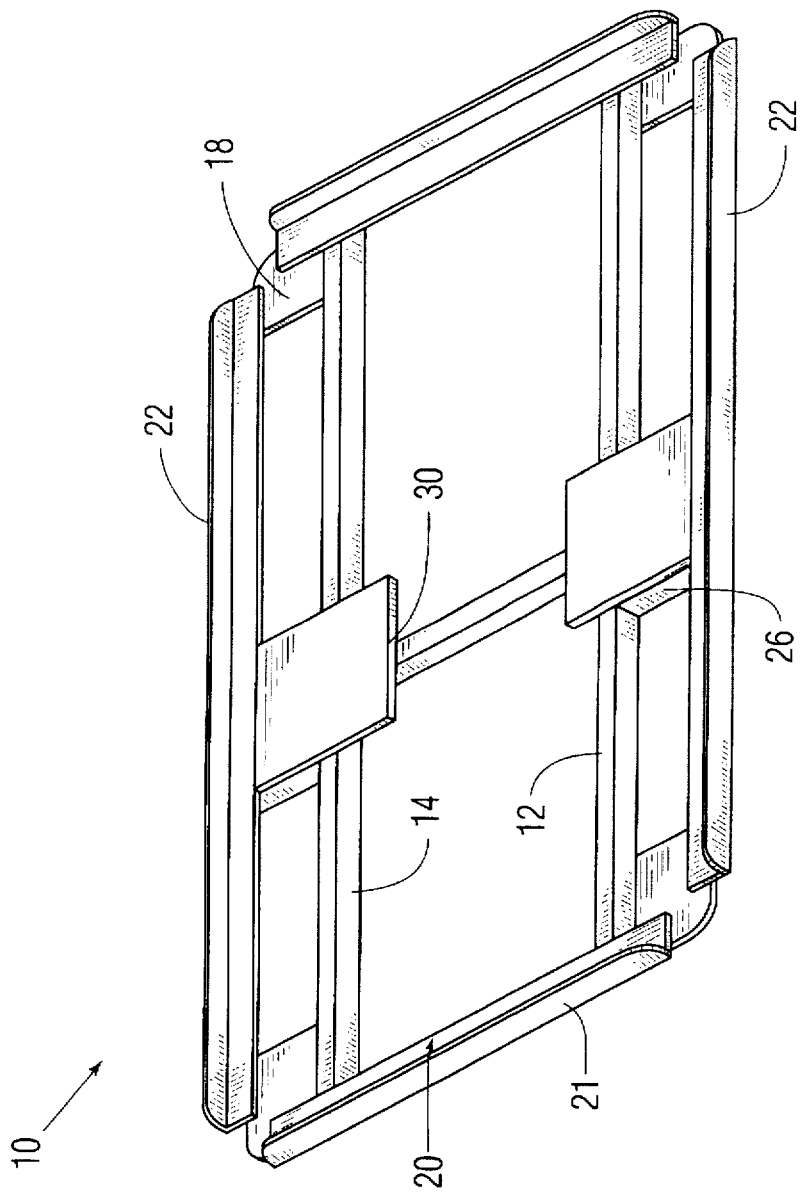
FIG. 2 is a bottom perspective of the member of FIG. 1.
Figure 3:
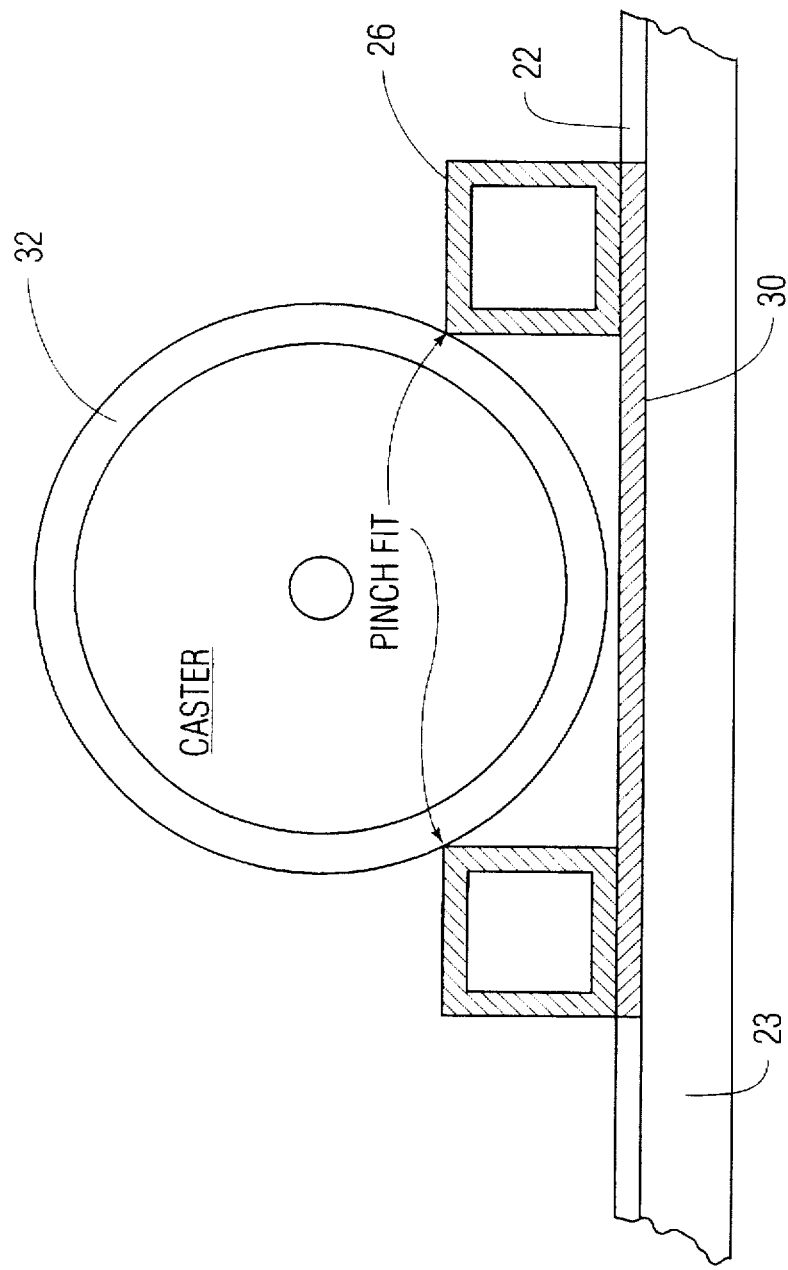
FIG. 3 is a section view taken along line 3—3 of FIG. 1 showing the fixed caster wheel of a stacked cart cooperating with the rails.

With reference to FIGS. 1 and 2, stacking member 10 comprises an H-frame formed of two longitudinal struts 12 and 14 and a transverse strut 16 welded to the sides of struts 12 and 14 at their mid-lengths. Struts 12, 14, and 16 can be formed of angle pieces, U-pieces, or round tubing or any other suitable profile. However, box tubing for struts 12, 14, and 16 is preferred. Four corner plates 18 are welded to the sides of the end portions of struts 12 and 14 and extend laterally and longitudinally therefrom. Struts 12 and 14 and plates 18 are dimensioned to locate corner plates 18 above the corner regions of the supporting cart such that a mid-region of plate 18 contacts and supports the corner swivel caster of the stacked cart as described below. The outer corners of plates 18 can be rounded to follow the profile if the upper frame of the supporting cart, for safety reasons, and to avoid tearing the cart liner.

Stacking member 10 further comprises end struts 20 and side struts 22 welded to the outside edge regions of plates 18 and the ends of struts 12 and 14 to strengthen member 10 and distribute static and dynamic support loads through to the top frame of the supporting cart. End and side struts 20 and 22 also function to quickly index member 10 into the precise installed position on the upper frame of the supporting cart. In one example, struts 20 and 22 comprise angle irons having their top leg welded beneath the outer edges of corner plates 18 and having their depending leg overhanging the outside of the end and side tubes of the supporting cart top frame, generally as shown. The lower outer corners of the depending legs of struts 20 and 22 are rounded to avoid tearing the canvas or vinyl liner and for safety.

Figure 5:
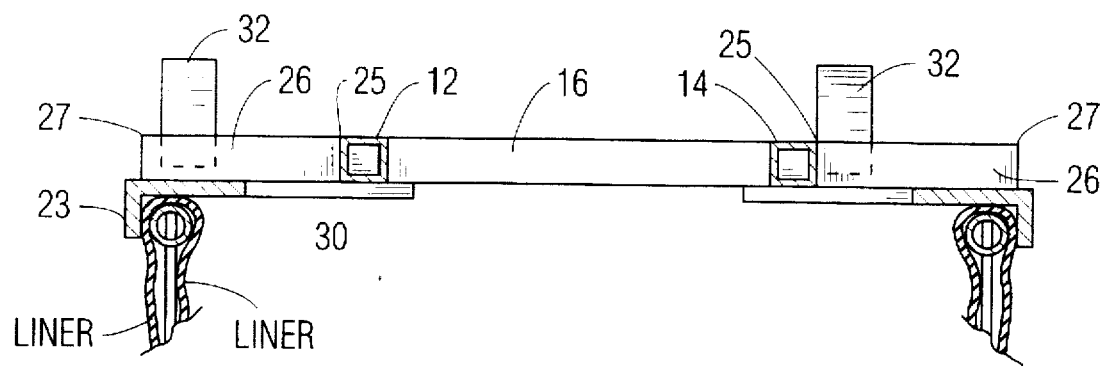
FIG. 5 is an end section view taken along line 5—5 of FIG. 1.

As better seen in FIGS. 1 and 5, a pair of transversely extending and longitudinally spaced rails 26 are welded to the outside of struts 12 and 14 and the top surface of side struts 22. A further piece should be connected between rails 26 to provide further longitudinal strength therebetween. Preferably, plate 30 is welded to each rail pair generally as shown for this purpose and can have its inner portion welded to cross strut 16 and side struts 12 and 14 and its outer edge welded to side struts 22, as shown, for further strengthening of member 10. Rails 26 can be any suitable shape such as angle iron, U-shaped, etc., however, the box tube as shown is preferred.

The longitudinal spacing of rails 26 is predetermined to pinch fit or grip the center, fixed caster wheel of the stacked cart. It is preferred that such spacing will cause the rails to support substantially all of the weight of the stacked cart and its load and dynamic load forces that are and become transferred through that respective fixed center caster of the stacked cart. Accordingly, in a static mode, rails 26 cause the bottom of caster wheel 32 to be slightly raised above plate 30. In this way, rails 26 serve as fore and aft orienting and positioning stops to precisely longitudinally position the stacked cart when placed by a fork lift or other mechanism and to longitudinally secure the stacked cart. Thus, the four swivel corner casters resting on plates 18 need not be secured.

In addition, the pinch fit between rails 26 and caster wheel 32 provides lateral restraint since wheel 30 is well secured by friction and gripping of the pinch fit. Thus, when in a cornering tractor trailer or truck, or when carried by a fork lift, the stacked cart will not slip or shift sideways on member 10.

Rails 26 further enable the stacked cart to be imprecisely positioned in the transverse direction particularly in view of the transverse dimensions of plates 18 and rails 26. Accordingly, the dimension from the centermost points 25 of rails 26 on one side of member 10 to the outermost points 27 of rails 26 on the other side of member 10 should be slightly more than the distance between the inside of one center wheel 32 of stacked cart 40 to the outside of the other center wheel 32 of cart 40. In this way, if for some unlikely reason cart 40 shifts laterally on rails 26, the inside of one wheel 32 will abut against the outside of strut 12 or 14 before the other wheel 32 slips off the outer edges 27 of the other pair of rails 26. In addition plates 18 are dimensioned to support the corner casters 34 even if cart 40 assumes this extreme lateral position on rails 26 shown in FIG. 5.

Figure 6:
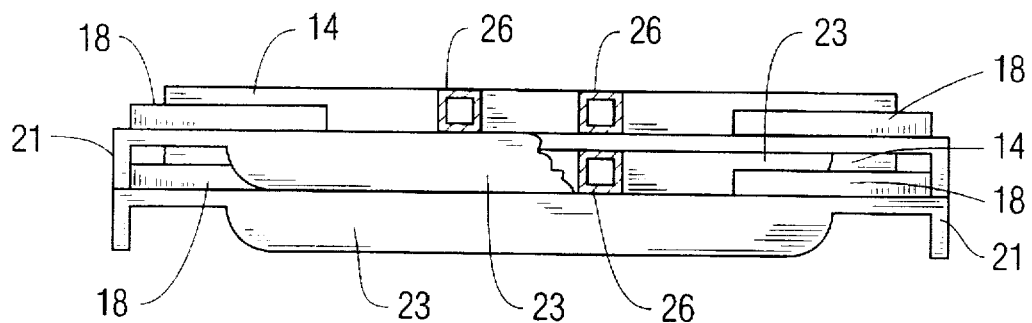
FIG. 6 is a side section, with parts broken away, of two stacking members nested together for storage.

As better seen in FIG. 1, all four rails 26 and struts 12 and 14 terminate short of the edge of the underlying side struts 22 and end struts 20 respectively. This allows an adjacent stacking member 10 of the same design and dimensions to nest with member 10 in the shortest vertical space. See FIG. 6 where the side struts and end struts 20 contact the corresponding side and end struts of an adjacent, nested stacking member.

Figure 4:
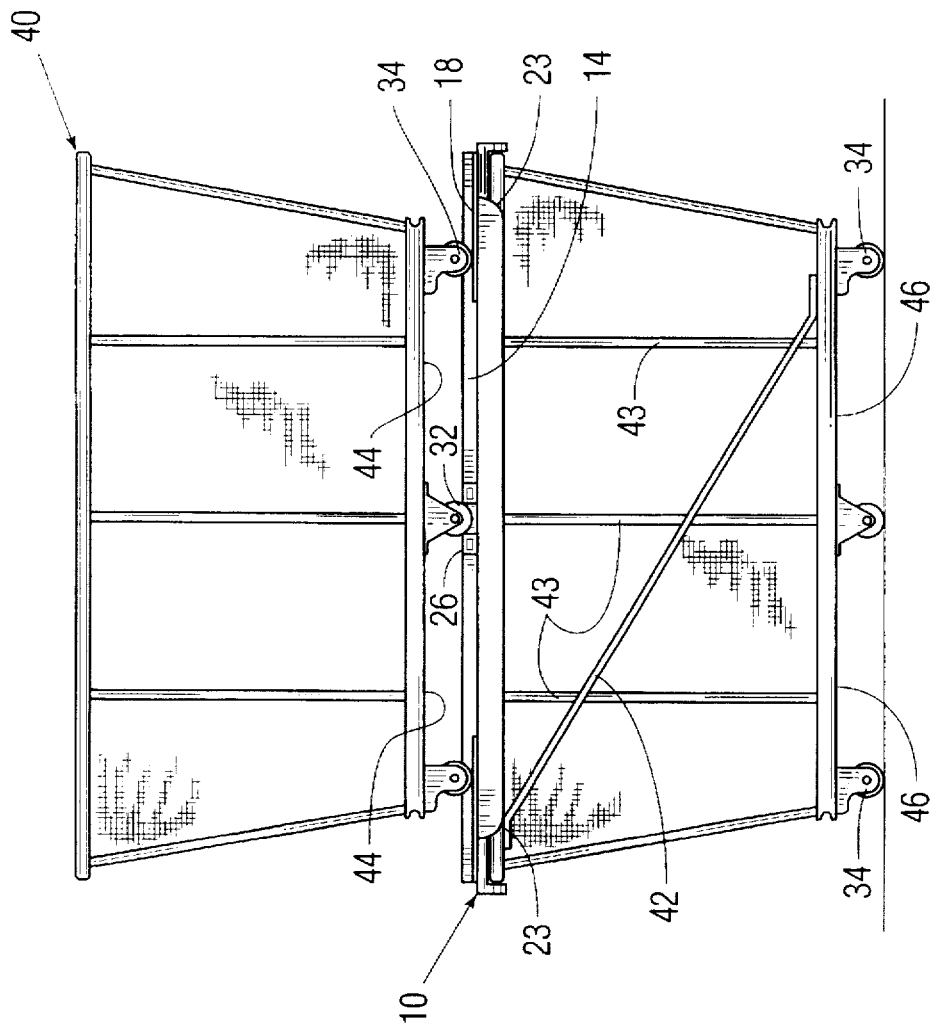
FIG. 4 is a side view of the two stacked cart and installed stacking member assembly.

With reference to FIG. 4, the lower or supporting cart is preferably strengthened during manufacture by welding a diagonal flexible metal rod 42 to the underside near one corner of the upper frame and the top of opposite corner of the bottom frame. Similar diagonal rods should be welded on the opposite side and both end sections of the cart. If desired, rod 42 can be welded to each upstanding rod 43 as well.

When stacking is desired, stacking member 10 is placed on to the canvas or vinyl covered top frame of supporting cart 41. The fact that cart 41 has only two or four wheels touching a flat supporting surface at any one time is insignificant. Flanges 21 and 23 aid in the quick and accurate placement of member 10. The end sections of cart 41 and the end sections of member 10 are shorter than the side sections for most standard carts. Member 10 requires no front-back orientation with cart 41.

A fully or partially loaded stacked cart 40 is raised by a fork lift or other mechanism and oriented so that the long side of cart 40 generally aligns with the long side of cart 41 and casters 32 and 34 are above member 10. Standard fork lift tongues extend under and lift cart 41 at the bottom frame zones marked 44. Once lifted, the fork lift operator approaches cart 41 from the side and aligns the center, fixed axis caster wheel 32 with rails 26. Once aligned, the operator lowers cart 40 until wheels 32 are indexed between and supported by rails 26. The only lateral requirement for cart 40 placement is that both wheels 32 lie outside struts 12 and 14. This alignment can be easily seen by the operator by watching that the two corner wheels 34 closest to the operator descend onto plates 18. The thicknesses of plates 18 are selected to support the four swivel cart wheels 34 notwithstanding the standard one-eighth inch vertical off-set of the center fixed caster 32 relative to the swivel casters 34. With wheels 32 and 34 so supported on member 10, the operator can lower and withdraw the fork lift tongues. The carts are ready for storage or transport.

If desired, the assembly can be transported locally by a standard fork lift that slides tongues under the bottom frame of cart 41 and engages at zones 46. In this way, both carts can be lifted simultaneously in their positions shown in FIG. 4 and transported by fork lift truck. Cart 41 remains longitudinally and transversely secured by member 10 as described above during lift and transport. Alternately, the assembly of carts 40, 41 and stacking member 10 can be manually walked and controlled by pushing cart 41 in the usual manner.

It should be understood that various modifications may be made to the herein disclosed exemplary embodiment without departing from the teachings and concepts of the present invention.

I claim:

1. An assembly in combination comprising:
   a supporting wheeled cart having a generally rectangular upper frame with two upper frame sides and two upper frame ends,
   a stacked wheeled cart having a generally rectangular bottom frame having two bottom sides and two bottom frame ends, swivel corner caster wheels mounted at the corners of said bottom frame, and two fixed axis caster wheels mounted to the mid-length of said bottom frame sides, and
   a unitary stacking member releasably supported by said upper frame for releasably supporting said two fixed axis caster wheels and at least two of said swivel caster wheels and for gripping said two fixed axis caster wheels to prevent longitudinal and lateral movement of said stacked cart during transport and storage of the combination.

2. An assembly in combination comprising:
   a supporting wheeled cart having a generally rectangular upper frame with two upper frame sides and two upper frame ends,
   a stacked wheeled cart having a generally rectangular bottom frame having two bottom sides and two bottom frame ends, swivel corner caster wheels mounted at the corners of said bottom frame, and two fixed axis caster wheels mounted to the mid-length of said bottom frame sides, and
   a stacking member releasably supported by said upper frame for releasably supporting said two fixed axis caster wheels and at least two of said swivel caster wheels and for gripping said two fixed axis caster wheels to prevent longitudinal and lateral movement of said stacked cart during transport and storage of the combination, and wherein said stacking member comprises a pair of longitudinally spaced supporting stop members for engaging and supporting each fixed axis caster wheel to provide positive longitude stops and to provide lateral friction resistance to lateral movement of said respective fixed axis caster wheel.

3. An assembly according to claim 2, wherein said supporting stop members extend laterally so that said fixed caster wheel can be supported and secured at a plurality of transverse positions.

4. An assembly according to claim 3, wherein said supporting stop members are continuous to support and secure said fixed axis caster wheel at an infinite number of lateral positions.

5. An assembly according to claim 2, wherein said stacking member comprises corner plates for supporting said swivel caster wheels.

6. An assembly according to claim 2, wherein said stacking member comprises two side members and two end members for distributing the static and dynamic forces through said swivel caster wheels and said fixed axis caster wheels down through substantially said entire upper frame.

7. An assembly according to claim 6, wherein said two side members and two end members comprise indexing members depending along the outside of said two upper frame sides and two upper frame ends respectively for indexing the proper position of said stacking member on said upper frame.

8. An assembly according to claim 7, wherein said two side members and said two end members comprise longitudinal angle pieces having an upper leg lying on said upper frame and a depending leg depending from said upper leg contiguous to said upper frame.

9. An assembly according to claim 8, wherein said depending legs includes rounded ends and said corner plates includes rounded outer corner edges.

10. An assembly according to claim 8, wherein said angle pieces have end portions welded to said corner plates.

11. An assembly according to claim 10, wherein said stacking member is nestable with other stacking plates of like design and dimension.

12. An assembly according to claim 1 1, wherein said upper leg includes an outer portion for contacting and supporting the depending leg of an adjacent nested stacking member of like design and dimension.

13. An assembly according to claim 5, wherein said stacking member comprises at least two longitudinal struts and at least one transverse strut connected to form an H-Frame, said longitudinal struts having ends connected to said corner plates.

14. An assembly according to claim 13 wherein said longitudinal struts have mid-lengths connected to said supporting stop members for distributing a portion of the dynamic and static load forces exerted through said fixed axis center wheels to said corner plates.

15. An assembly according to claim 14, wherein said supporting stop members comprise longitudinally spaced rail members having inner ends connected to said longitudinal strut mid-lengths and having outer ends supported by said two upper frame sides.

16. An assembly according to claim 15, wherein said stacking member comprises two side members and two end members for distributing the static and dynamic forces through said swivel caster wheels and said fixed axis caster wheels down through substantially said entire upper frame, and wherein said rail member outer ends are connected to said two side members.

17. An assembly according to claim 16, wherein said longitudinal and transverse struts are tubular in shape and said rail members are box tubular in shape.

18. An assembly according to claim 16, wherein plate members are connected to each said rail member, said longitudinal strut mid-lengths and said two side members.

19. An assembly according to claim 16, wherein said longitudinal and transverse struts and said rail members lie in a first plane.

20. An assembly according to claim 19, wherein said corner plates lie in said first plane and said two side members and two end members lie in a second plane below said first plane.

* * * * *

UNITED STATES PATENT AND TRADEMARK OFFICE
CERTIFICATE OF CORRECTION

PATENT NO. : 5,785,328
DATED : July 28, 1998
INVENTOR(S) : Donald Eckloff

It is certified that error appears in the above-indentified patent and that said Letters Patent is hereby corrected as shown below:

Column 5, line 53, before "caster", add --axis--.

Column 6, line 23, change "1 1" to --11--.

Signed and Sealed this

Twenty-ninth Day of September, 1998

Attest:

BRUCE LEHMAN

Attesting Officer     Commissioner of Patents and Trademarks